United States Patent [19]

Johnson et al.

[11] Patent Number: 5,382,451
[45] Date of Patent: Jan. 17, 1995

[54] METHOD FOR COATING ADHESIVE POLYMERS

[75] Inventors: Richard H. Johnson, Washington; Stephen E. Krampe, Maplewood; Chung I. Young, Roseville, all of Minn.

[73] Assignee: Minnesota Mining and Manufacturing, St. Paul, Minn.

[21] Appl. No.: 863,857

[22] Filed: Apr. 6, 1992

[51] Int. Cl.$^6$ .............................................. B05D 5/10
[52] U.S. Cl. .................... 427/208.4; 427/420; 427/428; 428/349; 428/355; 524/379; 524/389
[58] Field of Search ............... 427/208.4, 208.2, 420, 427/428; 524/379, 389; 428/349, 355

[56] References Cited

U.S. PATENT DOCUMENTS

| Re. 24,906 | 12/1960 | Ulrich | 206/59 |
|---|---|---|---|
| 2,708,192 | 5/1955 | Joesting et al. | 117/122 |
| 3,558,746 | 1/1971 | Sliwka et al. | 260/885 |
| 3,567,813 | 3/1971 | Keane et al. | 264/102 |
| 3,925,282 | 12/1975 | Davis et al. | 260/23 |
| 3,941,865 | 3/1976 | Miller et al. | 264/95 |
| 4,052,527 | 10/1977 | Pastor et al. | 428/463 |
| 4,094,948 | 6/1978 | Blickenstaff | 264/206 |
| 4,234,662 | 11/1980 | Pastor et al. | 428/500 |
| 4,360,638 | 11/1982 | Bartman | 524/286 |
| 4,415,615 | 11/1983 | Esmay et al. | 428/40 |
| 4,423,182 | 12/1983 | Bartman | 524/367 |
| 4,504,615 | 3/1985 | Mills | 524/291 |
| 4,551,388 | 11/1985 | Schlademan | 428/355 |
| 4,554,324 | 11/1985 | Husman et al. | 525/301 |
| 4,761,453 | 8/1988 | Allen | 524/612 |
| 4,762,888 | 8/1988 | Sun et al. | 525/125 |
| 4,833,179 | 5/1989 | Young et al. | 522/183 |
| 4,851,278 | 7/1989 | Enanoza | 428/195 |
| 4,874,839 | 10/1989 | Montoya et al. | 528/480 |
| 4,876,307 | 10/1989 | Allen | 524/612 |
| 4,952,650 | 8/1990 | Young et al. | 526/194 |
| 5,009,224 | 4/1991 | Cole | 128/156 |
| 5,236,645 | 8/1993 | Jones | 264/78 |

FOREIGN PATENT DOCUMENTS 0360467  3/1990  European Pat. Off.
056859A 10/1991  Hungary.

OTHER PUBLICATIONS

D. Satas, Ed., "Handbook of Pressure Sensitive Adhesive Technology," Van Nostrand, N.Y., Chapter 13, pp. 298 and 291 (1982); Chapter 28, pp. 558-573 (no month available).

*Radian Corporation*, "Chemical Additives for the Plastics Industry:Properties, Applications, Toxicologies", pp. 99-101, Noyes Data Corp., Park Ridge, N.J. (1987) (no month available).

"Plastics Additives Handbook: Stabilizers, Processing Aids, Plasticizers, Fillers, Reinforcements, Colorants for Thermoplastics", R. Gachter and H. Muller, Eds., pp. 423-467, Hanser, N.Y. (3rd ed., 1990) (no month available).

"Encyclopedia of Polymer Science and Engineering", H. Mark et al., Eds., Index Volume, pp. 307-324, John Wiley & Sons, N.Y. (1990); vol. 6, pp. 617-629 (no month available).

B. G. Frushour, 4 Polymer Bulletin, 305-314 (1981) (no month available).

7 Polymer Bulletin, 1-8 (1982) (no month available).

11 Polymer Bulletin, 375-382 (1984) (no month available).

(List continued on next page.)

Primary Examiner—Bernard Pianalto
Attorney, Agent, or Firm—Gary L. Griswold; Walter N. Kirn; Amy J. Hoffman

[57] ABSTRACT

A method of coating an adhesive polymer comprising hot-melt coating a composition of a hydrophobic adhesive polymer and a transient polar processing aid onto a substrate is provided. In addition, a method of coating a hydrophobic adhesive polymer when contacted with a transient polar processing aid, and a hot-melt coatable adhesive composition are also provided. These methods provide clear, smooth, and foam-free coatings, that are also substantially free of high temperature, low temperature, and processing aid-induced coating defects.

48 Claims, No Drawings

OTHER PUBLICATIONS

M. Mack, "Choosing an Extruder for Melt Devolatilization", *Plastics Engineering*, pp. 47–51 (Jul., 1986).

"Perry's Chemical Engineers' Handbook", R. H. Perry et al. Eds., McGraw-Hill, New York, N.Y. (sixth ed., 1984), Chapter 19, pp. 103–107 (no month available).

"Solid–Liquid Separation", L. Svarovsky, ed., Butterworths, London, England (1977) (no month available).

"Handbook of Separation Techniques for Chemical Engineers", McGraw-Hill, New York, N.Y. (2nd ed., 1988) (no month available).

L. Mascia, "The Role of Additives in Plastics," p. 16, John Wiley & Sons, New York, N.Y. (1974) (no month available).

"Additives for Plastics," R. Seymour, Ed., p. 250, Academic Press, New York, N.Y. (1978) (no month available).

S. Houlihan, "One-Line Additive Injection in the Extrusion Process", *Tappi Proceedings of the 1988 Polymers, Laminations, and Coatings Conference*, pp. 9–11, Tappi Press, Atlanta, Ga. (1988) (no month available).

"Solid–Liquid Separation, Introduction," *Ullmann's Encyclopedia of Industrial Chemistry* (1985) vol. B2 (Chapter 9, pp. 9-1 through 9-7) (no month available).

*Handbook of Adhesives*, I. Skeist, ed. (3rd Ed., 1990) (p. 441) (no month available).

Nichols, R.J., et al. "Direct Extrusion of Polymer Latex Emulsions," *Advances in Polymer Technology* (1983) vol. 3, No. 1, pp. 41–50.

Shen, J. et al. "Effects of sorbed water on properties of low and high molecular weight PMMA: 1. Deformation and fracture behaviour," *Polymer*, 1985, vol. 26, April.

METHOD FOR COATING ADHESIVE POLYMERS

FIELD OF THE INVENTION

This invention relates to methods of hot-melt coating adhesive polymers, and in particular, pressure-sensitive adhesive polymers, using processing aids.

BACKGROUND OF THE INVENTION

The coating of adhesive polymers, including pressure-sensitive adhesives, such as rubber-based materials, onto suitable backings is well-known in the art. Typically, these adhesive polymers are formed by solution or emulsion polymerization techniques. Thereafter, the resultant adhesive polymers are coated either directly from their reaction medium, or subsequent to isolation and dissolution, onto a substrate. See e.g., D. Satas, Ed., "Handbook of Pressure Sensitive Adhesive Technology," Van Nostrand, New York, Chapter 13, pg. 298 (1982).

Over the past several years, research has focused upon the production of adhesive polymers through solvent-free polymerization techniques. For example, U.S. Pat. Nos. 4,833,179, and 4,952,650 disclose the production of acrylate-based pressure-sensitive adhesive copolymers in an aqueous medium via suspension polymerization techniques. However, to date, these adhesives are isolated from the aqueous medium, dissolved in an organic solvent, and coated therefrom onto a suitable substrate, such as a tape backing material. Thus, while organic solvents can be eliminated as a reaction medium for the polymerization of many adhesive polymers, they are still typically used to coat these adhesive materials.

A number of problems arise from the use of organic solvents as a coating media. Most useful organic solvents are flammable, and thus, can pose a safety hazard, both during and after coating. Also, the relatively high cost of organic solvents can substantially increase the final cost of the adhesive-coated product. Finally, the organic solvents must be removed from the coated adhesive, typically by evaporative drying, after coating. This subsequent removal of organic solvents results in additional energy and equipment costs, and poses safety and environmental disposal problems.

In an effort to overcome the problems associated with organic solvent-coated adhesives, hot-melt extrusion coating of adhesive polymers has been employed. In theory, hot-melt extrusion coating of a dry adhesive polymer from the melt state should provide numerous advantages, including elimination of unwanted organic solvents, and nearly an instantaneous bonding of the hot adhesive to a suitable substrate. However, in practice, useful hot-melt coating can be difficult to achieve, particularly where odor-free adhesive coatings, such as in the medical field, are required. For example, many desirable adhesive polymers, such as acrylate-based pressure-sensitive adhesives, exhibit high viscosities, even at normally elevated temperatures. Accordingly, these adhesive polymers must be subjected to increased processing temperatures to lower their melt viscosity to a sufficient level that a smooth, clear, hot-melt coating can be obtained. However, these higher processing temperatures also lead to significant thermal degradation of the adhesive polymer. It is this thermal degradation that results in unwanted odors, off-color coatings, and potential reduction in adhesive and cohesive properties of the coated adhesive polymer.

Numerous pre-processing and post-processing chemical modifications of adhesive polymers have been proposed to help alleviate this thermal degradation problem. For example, U.S. Pat. No. 4,851,278 discloses thermally-reversible crosslinking, through the use of metal ions, such as zinc, to lower the melt viscosity of acrylate-based adhesives at elevated temperatures. See also, U.S. Pat. Nos. 4,360,638 and 4,423,182. Similarly, U.S. Pat. No. 3,925,282 utilizes both tertiary-amine containing monomers and organometallic salts to lower melt viscosity of acrylate polymers at elevated temperatures. Also, U.S. Patent Nos. 4,554,324, 4,551,388, and 3,558,746 all describe acrylate graft copolymers with favorable viscosity profiles.

Further, U.S. Pat. No. 4,762,888 discloses certain specified mixtures of acrylic copolymers that exhibit thermally-reversible hydrogen bonding. Also, the admixture of photocrosslinking agents to lower-molecular weight polymers, followed by radiation curing after coating, is described in U.S. Pat. Nos. 4,052,527 and 4,234,662. However, in all of these instances, special equipment, unusual and expensive monomers, and/or additives which are undesirable in the final coated adhesive product are required to yield the disclosed results.

In another approach, various processing aids can be added to polymers to limit their thermal degradation during general melt processing. For example, lubricating processing aids, such as fatty acids, fatty alcohols, metallic soaps, waxes, and various inorganic materials, modify the melt flow behavior of polymers, and thereby, limit the degree of thermal degradation to the polymer during melt processing. See e.g., Radian Corporation, "Chemical Additives for the Plastics Industry: Properties, Applications, Toxicologies", pp. 99–101, Noyes Data Corp., Park Ridge, N.J. (1987); "Plastics Additives Handbook: Stabilizers, Processing Aids, Plasticizers, Fillers, Reinforcements, Colorants for Thermoplastics" R. Gächter and H. Müller, Eds., pp 423–467, Hanser, N.Y. (3rd. ed., 1990). However, these processing aids are typically non-volatile materials that remain as a component of the polymer after processing, and thereby, can adversely affect the polymers ultimate properties, such as transparency, toxicity, odor, strength, and adhesive properties. Furthermore, the processing aid may bleed to the surface of the extruded polymer, and impart undesirable surface properties thereto. See "Encyclopedia of Polymer Science and Engineering" H. Mark et al., Eds., Index Volume, pp. 307–324, John Wiley & Sons, New York (1990).

Water is recognized as a processing aid in the melt extrusion of hydrophilic polymers. Specifically, the addition of water to hydrophilic polymers has been shown to lower their melt temperature and melt viscosity during general melt extrusion. For example, U.S. Pat. No. 3,941,865 discloses the addition of water to solid polyethylene oxide resin prior to extrusion, while U.S. Pat. Nos. 4,761,453, 4,876,307, and 4,874,307 disclose injection molding or extrusion of polyketones subsequent to saturation with water. Similarly, U.S. Pat. No. 4,094,948, and B. G. Frushour, 4 *Polymer Bulletin*, 305–314 (1981); 7 *Polymer Bulletin*, 1–8 (1982); and 11 *Polymer Bulletin*, 375–382 (1984), all show that the addition of water to acrylonitrile copolymers reduces their melt temperature for extrusion purposes.

While water has been used as a processing aid for hydrophilic polymers, it is considered to be an incompatible and undesirable additive in the hot-melt extrusion coating of hydrophobic adhesive polymers. For example, it is known that injection of water into a molten hydrophobic polymer can cause the composition to bubble and foam. See e.g., M. Mack, "Choosing an Extruder for Melt Devolatilization" *Plastics Engineering*, pg. 49 (July, 1986). Thus, it is a fast-held belief by those skilled in the art that inclusion of all but the smallest quantity of water in a hydrophobic adhesive polymer during hot-melt coating will lead to foaming of the polymer extrudate at the coating die/substrate interface, and accordingly, to a defective, nonuseable adhesive coating with bubbles, coating gaps, and other coating irregularities.

Furthermore, the inclusion of water is considered so deleterious to obtaining an effective adhesive coating, that those skilled in the art teach that optimum hot-melt coatings of hydrophobic adhesive polymers can only be obtained by coating as close as possible to a 100% solids, water-free, composition onto a suitable substrate. However, as noted above, this requires the use of costly curing equipment, exotic monomers, or additives with unwanted side-effects to avoid unwanted thermal degradation. Likewise, if the hydrophobic adhesive polymer is coated at a lower melt temperature, the high melt viscosity of the polymer will lead to defects in the adhesive coating, including a whitish translucent coloration, visible melt-flow lines, an irregular "shark skin" surface, as well as other coating irregularities. Thus, present methods of hot-melt coating hydrophobic adhesive polymers necessitate unwanted compromises in coating quality in an effort to hot-melt extrusion coat these materials.

SUMMARY OF THE INVENTION

Surprisingly, it has been discovered that a hydrophobic adhesive polymer can be hot-melt coated onto a suitable substrate using water, or other transient polar materials as processing aids. Unexpectedly, no foaming of the adhesive extrudate is observed from the orifice of the coating die, or if foaming is observed, it is eliminated through the use of a contact coating die. Thus, a uniform, clear coating, that is free of foam-induced adhesive gaps, bubbles, or other coating defects, is obtained. Furthermore, inclusion of the transient polar processing aid can be used to significantly reduce the melt temperature and melt viscosity of the hydrophobic adhesive polymer relative to the same hydrophobic adhesive polymer lacking the processing aid. Thus, the resultant hydrophobic adhesive coating is substantially free from thermal degradation, as well as melt flow lines, translucent coloration, and/or a shark skin appearing surface. Furthermore, due to their fugitive nature, the transient polar processing aids do not significantly affect the ultimate properties of the final hydrophobic adhesive polymer coatings.

Specifically, the present invention provides a method of coating an adhesive polymer comprising hot-melt coating an adhesive composition of a hydrophobic adhesive polymer and a transient polar processing aid from an orifice of a coating die onto a substrate, wherein the transient polar processing aid comprises at least 0.5 percent by weight above the weight of residual water present in the hydrophobic adhesive polymer equilibrated at ambient conditions, and wherein the adhesive composition is hot-melt coated at a temperature below the boiling point of the transient polar processing aid at atmospheric pressure.

Also, the present invention can provide a method of coating an adhesive polymer comprising hot-melt coating an adhesive composition of a hydrophobic adhesive polymer and a transient polar processing aid from an orifice of a contact coating die onto a substrate, wherein the transient polar processing aid comprises at least 0.5 percent by weight above the weight of residual water present in the hydrophobic adhesive polymer equilibrated at ambient conditions, and wherein the adhesive composition is hot-melt coated at a temperature at or above the boiling point of the processing aid at atmospheric pressure.

The present invention also can provide a method of coating an adhesive polymer comprising hot-melt coating a hydrophobic adhesive polymer and a transient polar processing aid from an orifice of a coating die onto a substrate, wherein the transient polar processing aid comprises at least 0.5 percent by weight above the weight of residual water present in the hydrophobic adhesive polymer equilibrated at ambient conditions, and wherein the hydrophobic adhesive polymer and the transient polar processing aid are not substantially mixed prior to hot-melt coating of the hydrophobic adhesive polymer.

In addition, the present method can provide a method of coating an adhesive polymer comprising: (a) providing a hydrophobic adhesive polymer suitable for hot-melt coating; (b) adding a transient polar processing aid along with the hydrophobic adhesive polymer, wherein the transient polar processing aid comprises at least 0.5 percent by weight above the weight of residual water present in the hydrophobic adhesive polymer equilibrated at ambient conditions; and (c) hot-melt coating the hydrophobic adhesive polymer onto a substrate utilizing control means for elimination of foaming of the hydrophobic adhesive extrudate.

Further, the present invention can provide a hot-melt coatable adhesive composition comprising a hydrophobic adhesive polymer in combination with a transient polar processing aid, wherein the transient polar processing aid comprises at least 0.5 percent by weight above the weight of residual water present in the hydrophobic adhesive polymer equilibrated at ambient conditions, and wherein the adhesive composition is capable of being hot-melt coated onto a substrate to provide a substantially foam-free adhesive coating.

These and various other advantages and features of novelty which characterize the invention are pointed out with particularity in the claims annexed hereto and forming a part hereof. However, for a better understanding of the invention, its advantages, and objects obtained by its use, reference should be had to the accompanying descriptive matter, in which there is illustrated and described preferred embodiments of the invention.

DEFINITIONS

For the purposes of this invention:

"Polymer" refers to a homopolymer, a copolymer, or an oligomer, as well as any mixtures or blends of one or more homopolymers, and/or one or more copolymers, and/or one or more oligomers.

"Copolymer" refers to a polymeric material produced by the polymerization of two or more dissimilar monomers, either with or without another functional group grafted thereto, as well as to a homopolymer with a functional group grafted thereto. Thus, the term "copolymer" includes, without limitation, random copolymers, block copolymers, sequential copolymers, and graft copolymers.

"Adhesive polymer" refers to a polymer that is inherently adhesive, or has been rendered adhesive by combining additives and/or modifiers with the polymer. Examples of suitable additives and/or modifiers include, without limitation, tackifiers, plasticizers, stabilizers, pigments, antioxidants, cross-linking agents, and combinations thereof.

A "hydrophobic adhesive polymer" refers to an adhesive polymer that has a strong tendency to repel, and is essentially incapable of dissolving in, water.

An "equilibrated" hydrophobic adhesive polymer refers to a hydrophobic adhesive polymer in which the residual water content remains constant at ambient conditions, as defined below. Thus, at equilibrium, the number of water molecules leaving the hydrophobic adhesive polymer is equal to the number of water molecules entering it.

"Ambient conditions" refers to the temperature and relative humidity conditions of a typical room in which a hydrophobic adhesive polymer is allowed to equilibrate prior to processing by the method of the present invention. In general, ambient conditions includes temperatures of from about 20° C. to about 25° C., and relative humidities of from about 40% to about 60%. For the purposes of determining the equilibrium residual water content of a hydrophobic adhesive polymer according to the present invention, ambient conditions are taken to be about 21° C. and about 50% relative humidity.

"Transient polar processing aid" refers to a compound or composition with a dipole moment that is used to facilitate the hot-melt coating of a hydrophobic adhesive polymer, and that is only present for a short period of time after the hot-melt coating of the hydrophobic adhesive polymer. Thus, a transient polar processing aid is a fugitive material that does not substantially affect the ultimate properties of the hot-melt coated hydrophobic adhesive polymer.

An "adhesive composition" refers to a substantially uniformly dispersed heterogeneous mixture of at least one hydrophobic adhesive polymer with at least one transient polar processing aid. In general, the adhesive composition will appear as a creamy or butter-like composition when substantially uniformly mixed according to the method of the present invention.

As used herein, "coating die" refers to a mechanical device, typically connected to the output end of a heated single- or twin-screw extruder, in which a molten adhesive or adhesive composition is extruded from an orifice adjacent a suitable substrate, such that the substrate is hot-melt coated with the molten adhesive or adhesive composition. In general, coating dies are used to apply an adhesive coating to a backing material during the preparation of tapes, dressings, envelopes, abrasive products, and the like. Examples of typical coating dies, includes, without limitation, draw dies, wipe-film dies, slot-orifice dies, drop-film dies, and roll coaters.

"Contact coating die" refers to a coating die in which the orifice of the coating die and the substrate to be coated are, or nearly are, in intimate contact during the hot-melt coating process. Typically, the contact between the extruded molten adhesive or adhesive composition and the substrate results in a uniform pressure across the coating die orifice that can be manipulated, along with the proximity of the orifice to the substrate surface, as well as the coating speed, to regulate the thickness and uniformity of the resultant adhesive coating. A wipe-film coating die comprises but one example of a preferred contact coating die according to the present invention.

As used herein, "atmospheric pressure" refers to the pressure exerted by the air at the location where a hydrophobic adhesive polymer is being hot-melt coated according to the present method, which will support a column of mercury 760 mm high. For example, at sea level, atmospheric pressure is taken to be about 0.01 MPa (14.696 psi).

DETAILED DESCRIPTION OF EMBODIMENTS OF THE INVENTION

Processing Aids

Any polar material, preferably a polar liquid, that is incompatible with the hydrophobic adhesive polymers used in the method of the present invention, and that rapidly dissipates after the hot-melt coating of the hydrophobic adhesive polymers, can serve as a transient polar processing aid in the present method. Nonlimiting examples of suitable transient polar processing aids for use in the method of the present invention include, water, methanol, ethanol, isopropanol, and combinations thereof, with water being preferred. Importantly, utilization of transient polar liquids, such as water, ensures that the processing aid is a fugitive material that does not remain along with, or as a component of, the hydrophobic adhesive polymer after hot-melt coating. Thus, the transient polar processing aid does not substantially affect the ultimate properties, including, without limitation, the clarity, smoothness, tack, or shear strength, of the hydrophobic adhesive coating.

The transient polar processing aid utilized in the method of the present invention should comprise at least 0.5% by weight above the weight of residual water present in the hydrophobic adhesive polymer equilibrated at ambient conditions. Preferably, the transient polar processing aid should comprise from about 0.5% to about 10% by weight, more preferably from about 1% to about 5% by weight above the weight of residual water present in the hydrophobic adhesive polymer equilibrated at ambient conditions. In this regard, the residual water present in the hydrophobic adhesive polymer can derive from a number of sources. For example, the residual water present in the hydrophobic adhesive polymer equilibrated at ambient conditions could come from excess water remaining after separation of the hydrophobic adhesive solids from the aqueous reaction medium of a suspension or emulsion polymerized hydrophobic adhesive polymer.

In any of the embodiments of the method of the present invention, the transient polar processing aid can occur in a liquid form, vapor form, or a combination thereof. For example, when the hydrophobic adhesive polymer is hot-melt coated at temperatures that exceed the boiling point of the transient polar processing aid at atmospheric pressure, the processing aid will typically vaporize immediately after coating to leave a smooth, clear adhesive coating that is substantially free of any residual transient polar processing aid. On the other hand, when the hydrophobic adhesive polymer is hot-melt coated at temperatures below the boiling point of the transient polar processing aid at atmospheric pressure, the processing aid will typically occur as a liquid, or a liquid/vapor combination. In this case, if a contact coating die is used, the pressures generated at the die orifice/substrate interface may be such that the transient polar processing aid flashes off almost immediately after the hot-melt coating of the hydrophobic adhesive polymer. Conversely, if a non-contact coating die, such as a draw die, is employed, the transient polar processing may occur in a substantially liquid form, that will evaporate or otherwise dissipate from the hydrophobic adhesive soon after hot-melt coating.

In this regard, the inherent incompatibility between the transient polar processing aid and the hydrophobic adhesive polymer will greatly enhance the tendency of the transient polar processing aid to dissipate from the resultant hydrophobic adhesive coating as rapidly as possible. In addition, the elevated coating temperatures preferably used according to the method of the present invention will further enhance the tendency of the transient polar processing aid to evaporate or otherwise dissipate from the resultant hot-melt adhesive coating. Thus, whether the hydrophobic adhesive polymer is hot-melt coated at temperatures and/or pressures above or below the boiling point of the transient polar processing aid external to the coating die, the transient polar processing aid will act as a fugitive processing aid that rapidly dissipates from the hot-melt coated adhesive coating, without substantially affecting the ultimate properties of the coating. Furthermore, whatever the form of the transient polar processing aid, whether liquid, vapor, or a combination thereof, practice of the method of the present invention provides smooth, clear hot-melt coatings of hydrophobic adhesive polymers, where such coatings were not previously possible.

Hydrophobic Adhesive Polymers

Any hydrophobic adhesive polymer, as defined herein, can be processed according to the method of the present invention. For example, hydrophobic adhesive polymers displaying a $T_g$ of greater than 20° C., such as wax-EVA (ethylene vinyl acetate) hydrophobic adhesive blends suitable for carton sealing, can be processed by the method of the present invention. Preferably, however, the hydrophobic adhesive polymer comprises a hydrophobic pressure-sensitive adhesive polymer. More preferably, the hydrophobic pressure-sensitive adhesive polymer should exhibit a glass transition temperature ($T_g$) of 20° C. or less, and most preferably a $T_g$ of 0° C. or less. Examples of hydrophobic pressure-sensitive adhesive polymers, and their methods of preparation, are described in U.S. Pat. No. 2,708,192 (phenolic cured rubber based adhesives), U.S. Pat. No. Re 24,906 (water-based and solvent-based adhesives), and U.S. Pat. Nos. 4,833,179, and 4,952,650 (suspension-polymerized acrylate pressure-sensitive adhesive copolymers), the disclosures of which are all incorporated herein by reference.

Specific examples of suitable hydrophobic pressure-sensitive adhesive polymers for use in the method of the present invention include, without limitation, an adhesive copolymer of isooctyl acrylate (IOA) and methacrylic acid (MAA) in a 96:4 weight ratio, prepared as per example No. 5 of U.S. Pat. No. 4,952,650; KRATON TM -based resins of styrene/butadiene/styrene or styrene/isoprene/styrene adhesive block copolymers (Shell Chemical Co., Houston, Tex.); a polyisobutylene-based adhesive prepared using VISTANEX TM resins (Exxon Chemical Co., Houston, Tex.), according to the procedure detailed on page 291 of *The Handbook of Pressure-Sensitive Adhesive Technology*, supra; a rubber-based adhesive resin No. 820-338-BE (Findley Adhesives, Inc., Wauwatosa, Wis.); GELVA TM 737 resin, an ethylhexyl acrylate/vinyl acetate/ethyl acrylate adhesive copolymer (Monsanto Co., St. Louis, Mo.); DURO-TAK TM resin No. 34-42223, a rubber-based adhesive resin (National Starch and Chemical Corp., Bridgewater, N.J.); and No. 355 dimethylpolysiloxane medical adhesive (Dow Corning Corp., Midland, Mich.).

In a preferred embodiment, the hydrophobic pressure-sensitive adhesive polymer comprises an acrylate pressure-sensitive adhesive polymer, more preferably a water-based acrylate pressure-sensitive adhesive polymer formed through emulsion or suspension polymerization techniques. In a particularly preferred embodiment, the hydrophobic pressure-sensitive adhesive polymer comprises a suspension-polymerized acrylate pressure-sensitive adhesive copolymer having a $T_g$ of 0° C. or less, as described in Example No. 5 of U.S. Pat. No. 4,952,650.

In general, these preferred suspension-polymerized acrylate pressure-sensitive adhesive copolymers are produced by the following methodology. An acrylic acid ester of a non-tertiary alcohol, having from 1 to 14 carbon atoms, a polar monomer copolymerizable with the acrylic acid ester, a chain transfer agent, a free-radical initiator, and a modifier moiety selected from 2-polystyrylethyl methacrylate macromolecular monomers, reactive zinc salts, and hydrophobic silicas is combined into a monomer premix. This premix is then combined with a water phase containing a sufficient amount of a suspending agent, such as an anionic surfactant, to form a suspension. The suspension is then concurrently agitated and polymerized for about 2–16 hours, at a temperature of from about 40° C. to about 90° C., until polymer beads are formed. At this point, the polymer beads comprise about 40% of the suspension, and can thereafter be washed and separated as needed.

In the preferred suspension-polymerized acrylate pressure-sensitive adhesive copolymer, the acrylic acid ester of a non-tertiary alcohol should comprise at least about 80 parts by weight, based on a 100 parts total monomer content. Preferred acrylic acid ester monomers include, without limitation, isooctyl acrylate, isononyl acrylate, 2-ethylhexyl acrylate, and butyl acrylate, with isooctyl acrylate being particularly preferred. Also, preferred polar monomers include, without limitation, acrylic acid, methacrylic acid, N-vinyl pyrrolidone, vinyl acetate, acrylamides, and substituted acrylamides, while preferred modifier moieties include, without limitation, reactive zinc salts, and macromers, such as 1-polystyrylethyl methacrylate. In the especially preferred suspension-polymerized acrylate pressure-sensitive adhesive copolymer described in Example No. 5 of U.S. Pat. No. 4,952,650, the acrylic acid ester monomers, polar monomers and modifier moieties comprise isooctyl acrylate, methacrylic acid, and ZnO, respectively.

While no direct correlation exists, the molecular weight of the hydrophobic adhesive polymers processed by the method of the present invention can influence the degree to which the present method enhances the coating characteristics of a given hydrophobic adhesive polymer. In general, higher molecular weight hydrophobic adhesive polymers of up to about one million, or higher, molecular weight will more greatly benefit when processed by the method of the present invention. This is especially true with respect to the preferred suspension-polymerized acrylate pressure-sensitive adhesive copolymers processed by the method of the present invention. In particular, these materials exhibit molecular weights ranging from about $10^5$ to about $10^6$, and when hot-melt coated from the conventional dry state, undergo significant thermal degradation. However, when processed with the transient polar processing aids of the present invention, their melt temperatures and viscosities can be reduced to the point that virtually no thermal degradation occurs during the hot-melt coating process.

Whether polymerized in a solvent-based system or a water-based system, the majority, if not all, of the reaction medium in which the hydrophobic adhesive polymer is polymerized should be removed from the adhesive solids prior to processing by the method of the present invention. The particular separation method employed will depend upon whether the hydrophobic adhesive polymer is in a solution of an organic solvent, or in a two-phase water-based system, such as an emulsion or suspension polymerized hydrophobic adhesive polymer. In either instance, the separation method employed is not critical to the practice of the method of the present invention. Thus, those skilled in the art will readily choose a given separation technique that best fits their specific needs, based at least in part on the characteristic of the chosen hydrophobic adhesive polymer, and the hot-melt coating techniques and equipment to be employed.

For example, solution polymerized adhesive polymers are typically recovered by evaporative techniques, such as through the use of agitated thin-film evaporators. See e.g., "Perry's Chemical Engineers' Handbook" R. H. Perry et al. Eds., McGraw-Hill, New York, N.Y. (sixth ed., 1984). On the other hand, adhesive polymers prepared through emulsion or suspension techniques can be removed by either evaporative techniques or physical separation methods, such as screening, filtration, centrifugation, or expression processes. See e.g., "Perry's Chemical Engineers' Handbook", supra; "Solid-Liquid Separation". L. Svarovsky, ed., Butterworths, London, England (1977); "Handbook of Separation Techniques for Chemical Engineers", McGraw-Hill, New York, N.Y. (2nd ed., 1988). Furthermore, coagulants and flocculants may also be added to the hydrophobic adhesive polymer emulsions or suspensions to agglomerate the solids, and thereby, improve the efficiency of the separation technique.

In a preferred embodiment, the preferred suspension-polymerized acrylate pressure-sensitive adhesive copolymer is recovered from its aqueous reaction medium by mechanical separation methods. More preferably, the excess water remaining after polymerization of the adhesive copolymer is expressed from the adhesive solids component through the use of a mechanical press. See e.g., "Perry's Chemical Engineers' Handbook", supra, at Chapter 19, pp 103–107, the disclosure of which is herein incorporated by reference. In a particularly preferred embodiment, a continuous-screw extrusion press is used to separate the aqueous reaction medium from the preferred suspension-polymerized acrylate pressure-sensitive adhesive copolymer of the present invention. See e.g., Id. at 104–105. Low-temperature, mechanical expression of the reaction medium from the adhesive solids avoids excessive adhesive thermal degradation problems typically associated with other separation techniques, such as thermal evaporation of the excess reaction medium.

Coating Methods

As previously noted, traditional hot-melt coating of hydrophobic adhesive polymers often results in a number of coating defects resulting from the conditions employed, and/or the additives utilized. In particular, at least three different classes of coating defects can result from the traditional hot-melt coating of hydrophobic adhesive polymers.

As used herein, "high-temperature coating defects" refers to coating defects that result from the thermal degradation of a hydrophobic adhesive polymer when hot-melt coated at the traditional temperatures required to lower the melt viscosity of the polymer so that the molten polymer easily flows through the extruder and coating die orifice. Typical high-temperature coating defects, include, without limitation, discoloration of the coated adhesive polymer, an objectionable burnt odor, and/or loss of adhesive properties. See, e.g., L. Mascia, "The Role of Additives in Plastics," pg. 16, John Wiley & Sons, New York, N.Y. (1974); "Additives for Plastics," R. Seymour, Ed., pg 250, Academic Press, New York, N.Y. (1978).

"Low-temperature coating defects" refer to defects resulting from the hot-melt coating of hydrophobic adhesive polymers at temperatures where the molten polymer exhibits higher melt viscosities, and thus, has a tendency to adhere, at least in part, to the metal surfaces of the extruder and coating die during hot-melt coating. Accordingly, while utilization of these coating temperatures may reduce the degree of thermal degradation of the hydrophobic adhesive polymer, low-temperature coating defects, including, without limitation, whitish or translucent coloration, melt-flow lines, a "shark skin" appearing surface, and other surface irregularities, typically result. See e.g., "Plastics Additives Handbook", supra at pp. 436–438.

As noted above, utilization of typical processing aids in the general melt extrusion of hydrophobic polymers can detrimentally affect the ultimate properties of those polymers, due to the tendency of these processing aids to remain as a component of the hydrophobic polymer after extrusion. See e.g., "Encyclopedia of Polymer Science and Engineering", supra, at pp. 307–324. As used herein, "processing aid-induced coating defects" refers to the extension of these problems to the hot-melt coating of hydrophobic adhesive polymers with processing aids. In particular, these processing aid-induced coating defects can include, without limitation, loss of adhesive or cohesive properties, as well as undesirable discoloration, odor, and/or toxicity, being imparted to the resulting adhesive coating.

Practice of the method of the present invention yields a smooth, clear, foam-free adhesive coating that is substantially free of all three classes of coating defects. Specifically, in a first embodiment of the method of the present invention, an adhesive composition of a hydrophobic adhesive polymer and a transient polar processing aid are hot-melt coated from an orifice of a coating die onto a substrate. In this regard, the temperature of the transient polar processing aid at atmospheric pressure is an important consideration in the type of coating die used to hot-melt coat the adhesive composition.

In a first aspect, the adhesive composition is hot-melt coated onto the substrate at a temperature below the boiling point of the transient polar processing aid at atmospheric pressure. For example, an adhesive composition of the preferred suspension-polymerized acrylate pressure-sensitive adhesive copolymer, with water as the transient polar processing aid, is hot-melt coated at a temperature of less than 100° C. according to this aspect of the method of the present invention. Even though the hydrophobic adhesive polymer and transient polar processing aid are well-mixed into a substantially uniformly dispersed adhesive composition, surprisingly, no foaming of the adhesive composition is observed at the coating die orifice. Furthermore, when the adhesive composition is hot-melt coated onto a suitable substrate, a smooth, clear, and foam-free adhesive coating, that is free from high-temperature, low-temperature, and processing aid-induced coating defects, is obtained.

The ability to extrude a foam-free adhesive composition from the orifice of a coating die allows virtually any type of coating die to be used with this aspect of the method of the present invention. Thus, draw dies, wipe-film dies, slot-orifice dies, drop-film dies, roll-coaters, as well as other coating dies readily known and used by those skilled in the art, are considered to be useable with this aspect of the method of the present invention. For a thorough review of hot-melt coating dies and associated coating equipment, reference can be had to the "Handbook of Pressure-Sensitive Adhesive Technology", supra, at Chapter 28, pp 558–573, the disclosure of which is herein incorporated by reference.

Furthermore, the ability to produce a foam-free coating at temperatures below the boiling point of the transient polar processing aid at atmospheric pressure, virtually ensures that the resulting hydrophobic adhesive coating will be free of thermal degradation, and its resulting high-temperature coating defects. Unexpectedly, however, the hot-melt coating of the adhesive composition also results in an adhesive coating that is also substantially free of any low-temperature coating defects. In comparison, the hot-melt coating of the hydrophobic adhesive polymer in the absence of the transient polar processing aid, at temperatures below the boiling point of the transient polar processing aid at atmospheric pressure, would result in an adhesive coating with numerous low-temperature coating defects, such as melt flow lines, translucent coloration, and a shark skin appearance, if in fact, the hydrophobic adhesive polymer could even be fed into the extruder and coated at these temperatures.

In a second aspect of the first embodiment of the present invention, the adhesive composition is hot-melt coated onto the substrate at a temperature at or above the boiling point of the transient polar processing aid at atmospheric pressure. For example, a temperature at or above 100° C. is used to hot-melt coat the preferred adhesive composition of a suspension-polymerized acrylate pressure-sensitive adhesive copolymer and water onto a substrate. However, when these temperature conditions are employed with the substantially uniformly dispersed adhesive composition, at least some foaming of the adhesive composition at the coating die orifice will be observed. As used herein, "foaming" of the adhesive extrudate includes the occurrence of bubbles, such as moisture bubbles, or other observable discontinuities, within the adhesive extrudate, as well as the actual bubbling and/or frothing of the adhesive extrudate. Surprisingly, if a contact coating die is used, a smooth, clear, and foam-free adhesive coating is obtained, despite the tendency of the adhesive extrudate to foam from the die orifice. Thus, while those skilled in the art have to date viewed a foaming hydrophobic adhesive polymer extrudate as being non-coatable, this embodiment of the method of the present invention has shown otherwise.

Furthermore, utilization of a transient polar processing aid, such as water, can lower the coating temperature of the adhesive composition, relative to the hydrophobic adhesive polymer lacking the transient polar processing aid, so that virtually no thermal degradation, as indicated by high-temperature coating defects, of the resulting hydrophobic adhesive coating occurs. Likewise, the melt viscosity of the adhesive composition can be lowered such that the composition can be cleanly fed through the extruder, and thereafter, the contact coating die, without incurring low-temperature coating defects, such as melt-flow lines, translucent coloration, a shark skin surface, or the like. In addition, at the temperatures employed, the transient polar processing aid vaporizes upon exiting the coating die orifice. Thus, the resulting adhesive coating is smooth, clear, foam-free, and does not exhibit processing aid-induced coating defects resulting from excess processing aid remaining in the resultant hydrophobic adhesive coating.

Any contact coating die can be used with this aspect of the method of the present invention, as long as there is intimate, or nearly intimate, contact between the orifice of the coating die and the surface of the substrate to be coated. In a preferred embodiment, the contact coating die comprises a wipe-film coating die, such as those available from Extrusion Die, Inc., Chippewa Falls, Wis. However, it should also be realized that in certain instances, a foamed adhesive coating may be desired. In this regard, a coating die other than a contact die, such as a drop-film die, could be used to provide such a coating.

In a second embodiment of the method of the present invention, a hydrophobic adhesive polymer and a transient polar processing aid are contacted and hot-melt coated from an orifice of a coating die onto a substrate. In contrast to the coating of the substantially uniformly dispersed adhesive composition of the first embodiment of the present invention, the hydrophobic adhesive polymer and transient polar processing aid are not substantially mixed prior to hot-melt coating. In fact, it is desirable to utilize extruders, coating dies, and other equipment that impart little, or more preferably, essentially no mixing of the hydrophobic adhesive polymer and transient polar processing aid prior to hot-melt coating. Unexpectedly, when the transient polar processing aid is not substantially mixed with the hydrophobic adhesive polymer, no foaming of the hydrophobic adhesive polymer is observed at the orifice of the coating die, even when the hydrophobic adhesive is hot-melt coated at a temperature above the boiling point of the transient polar processing aid at atmospheric pressure. Thus, in contrast to the first embodiment of the method of the present invention, the temperature of the transient polar processing aid at atmospheric pressure is not an important consideration in obtaining a foam-free extrudate, and accordingly, a foam-free hot-melt hydrophobic adhesive coating.

As with the first aspect of the first embodiment of the method of the present invention, the non-foaming nature of the hydrophobic adhesive extrudate allows virtually any type of coating die to be used with this embodiment. Thus, draw dies, wipe-film dies, slot-orifice dies, drop-film dies, roll-coaters, as well as other coating dies readily known and used by those skilled in the art, can be used with this embodiment of the method of the present invention.

As noted above, the degree of mixing of the hydrophobic adhesive polymer and the transient polar processing aid can be controlled, at least in part, through the selection of appropriate hot-melt coating equipment, including extruders, coating dies, and associated equipment. In this regard, one way of limiting the mixing of the hydrophobic adhesive polymer and transient polar processing aid is to not bring the two components into contact until immediately prior to hot-melt coating. For example, in a typical embodiment, the hydrophobic adhesive polymer is fed into a single- or twin-screw extruder connected to any appropriate coating die. In addition, an injection port, connected to a high-pressure pump, is included in the extruder immediately prior to the coating die, and after any vent ports in the extruder barrel. In practice, the molten hydrophobic adhesive polymer progresses down the heated extruder until it encounters the injection port, where a pre-determined quantity of the transient polar processing aid is injected into the extruder along with the molten adhesive polymer. Immediately thereafter, the hydrophobic adhesive polymer reaches the coating die, without undergoing any substantial mixing with the transient polar processing aid, and is hot-melt coated onto a suitable substrate.

Late addition of the transient polar processing aid ensures minimal, if any, mixing of the hydrophobic adhesive polymer and transient polar processing aid prior to hot-melt coating. In addition, by injecting the transient polar processing aid after any extruder vent ports, the hot-melt coating operator can be assured that essentially all of the processing aid will come in contact with the molten hydrophobic adhesive polymer prior to its hot-melt coating onto the substrate. Alternatively, the transient polar processing aid could be brought into contact with the hydrophobic adhesive polymer at an earlier point in the process, provided that no mixing, or low mixing was maintained. For example, an extruder of relatively short length, with a smooth inner barrel surface, and lacking in any mixing pins or blades could be used to simply heat and convey the two components to the coating die. In either instance, the transient polar processing aid will flash-off, or otherwise dissipate from the resulting hot-melt adhesive coating, depending upon the coating temperature employed, to yield a clear, smooth, and foam-free hot-melt coating that is substantially free of any residual transient polar processing aid.

As with the previously described embodiment of the present invention, wherein a substantially uniformly dispersed adhesive composition is hot-melt coated, the addition of a transient polar processing aid provides a resultant hydrophobic adhesive coating that is substantially free of high-temperature, low-temperature, and processing aid-induced coating defects. Thus, whether the transient polar processing aid is intimately combined with the hydrophobic adhesive polymer to yield a substantially uniformly dispersed adhesive composition, or is just contacted with the hydrophobic adhesive polymer with little or no mixing, the method of the present invention provides clear, smooth, and foam-free hydrophobic adhesive coatings where such coatings were previously thought to be unobtainable.

In any of the embodiments or aspects of the method of the present invention, the hydrophobic adhesive polymer and transient polar processing aid can be brought together in various points in the process. For example, in one typical methodology, the transient polar processing aid is added along with the hydrophobic adhesive polymer immediately prior to coating. Typically this addition is accomplished through the high pressure injection of the transient polar processing aid into a heated extruder near the attachment point for the coating die, and after any vent ports located in the extruder barrel. As previously noted, this late addition of the transient polar processing aid is especially useful with the second embodiment of the present invention, wherein minimal or no mixing of the transient polar processing aid and hydrophobic adhesive polymer is desired prior to hot-melt coating. However, this late injection of the transient polar processing aid can also be utilized with the first embodiment of the present invention, as long as the hydrophobic adhesive polymer and transient polar processing aid are adequately mixed to form the substantially uniformly dispersed adhesive composition prior to hot-melt coating.

In a second typical methodology of the present invention, the transient polar processing aid is incorporated into, or is an existing component of, the hydrophobic adhesive polymer prior to feeding of the polymer into a non-vented extruder, and thereafter, to the coating die. For example, when the preferred suspension-polymerized acrylate pressure-sensitive adhesive copolymer used in the method of the present invention is polymerized, it forms adhesive beads in an aqueous medium. During the initial separation of the hydrophobic adhesive polymer from the reaction medium, a certain percentage of the aqueous reaction medium can be allowed to remain with the adhesive solids. This residual water can then serve as the transient polar processing aid of the method of the present invention, thereby obviating the need to inject a transient polar processing aid into the molten adhesive immediately prior to hot-melt coating. Similarly, even when a previously dried, essentially 100% solids, hydrophobic adhesive polymer is used, the transient polar processing aid can be added to the adhesive composition prior to its being fed into the non-vented extruder, and thereafter, the coating die.

The early addition, or maintenance of, the transient polar processing aid with the hydrophobic adhesive polymer is especially useful with the first embodiment of the method of the present invention. For example, a substantially uniformly dispersed adhesive composition often directly results from the mechanical separation of the aqueous reaction medium from the hydrophobic adhesive solids, such as through the use of the preferred continuous-screw extrusion press. Furthermore, by combining the transient polar processing aid and hydrophobic adhesive polymer prior to, or immediately after, feeding of the materials into a non-vented extruder, a thorough mixing of these components to form the adhesive composition can be accomplished prior to the hot-melt coating of the composition. In this regard, those skilled in the art will readily select appropriate equipment to facilitate the mixing, or limit the mixing, of the transient polar processing aid and the hydrophobic adhesive polymer as the particular circumstances require.

For example, extruder screws with mixing pins or blades, as well as various filters and gear pumps can be used to thoroughly mix the adhesive composition into a substantially uniform dispersion. Conversely, these components can be eliminated, and short, smooth extruders can be used to reduce or essentially eliminate the mixing of the hydrophobic adhesive polymer and transient polar processing aid prior to hot melt coating. Thus, it is within the scope of the present invention for the transient polar processing aid to be incorporated with the hydrophobic adhesive polymer at any stage of the process, including, during polymerization of the adhesive, prior to feeding of the adhesive into the non-vented extruder, and at any point within an extruder that is prior to the coating die and after any vent ports in the extruder barrel.

The ability to maintain a set quantity of the aqueous reaction medium in a suspension or emulsion polymerized hydrophobic pressure-sensitive adhesive, to serve as a transient polar processing aid, directly contradicts the standard teaching in the industry. Traditional processing methodology dictates that an emulsion or suspension hydrophobic adhesive polymer be dried to remove essentially all of the water prior to hot-melt coating. Failure to remove essentially all of the residual water would be expected to result in a non-coatable foaming extrudate. Further, even if one were to try and coat this foaming extrudate, it would be expected that undesirable adhesive coating with gaps, bubbles, and other irregularities would result. Surprisingly, the method of the present invention allows for the maintenance of a certain percentage of water along with the hydrophobic adhesive polymer, while still providing a hydrophobic adhesive, or an adhesive composition, that does not foam upon exiting the coating die, or should foaming occur, can be coated to provide a clear, smooth, and foam-free adhesive coating through the use of a contact coating die.

The specific percentage of water, or other transient polar processing aid, that is allowed to remain with the hydrophobic adhesive polymer prior to extrusion and hot-melt coating depends upon the particular adhesive being employed, and the coating characteristics desired to be obtained. For example, when coating the preferred suspension-polymerized acrylate pressure-sensitive adhesive copolymer, once a preferred water content is determined, appropriate adjustments can be made in the starting water content of the hydrophobic adhesive as needed. If need be, the water-based adhesive can be subjected to additional drying or separation techniques to lower the water content to the desired hot-melt coating level. Likewise, water, or other transient polar processing aids, can be added to the dried composition prior to extrusion and coating to arrive at the desired water content. In addition, these same adjustments can be made with other hydrophobic adhesive polymers, and transient polar processing aids other than water.

The specific hot-melt coating conditions to be employed with any given hydrophobic adhesive polymer can be readily determined by those skilled in the art. For example, in one aspect, optimum coating conditions can be established by coating the hydrophobic adhesive polymer in the absence of a transient polar processing aid, at a baseline temperature well below the thermal degradation point for that adhesive. At such a temperature, the resulting hot-melt coating will likely show numerous low-temperature coating irregularities, such as melt flow lines, shark skin, and a translucent coloration. Thereafter, increasing amounts of a desired transient polar processing aid can be injected, or otherwise added, along with the molten adhesive polymer while observing the quality, as a reflection of the melt viscosity, of the resulting hot-melt coating. At a determinable point, the combination of the coating temperature and quantity of transient polar processing aid added will yield a high quality, hot-melt coating, that is foam-free and substantially free from low-temperature coating defects. Similarly, those skilled in the art will recognize that other optimum conditions can be readily determined by varying the temperature and/or pressure of the extruder and coating die at a pre-determined rate of addition of a transient polar processing aid according to the method of the present invention.

The hot-melt coating method of the present invention can be utilized to hot-melt coat a hydrophobic adhesive polymer onto virtually any substrate material. Options in substrates to be utilized will be apparent, and readily selected, by those skilled in the art. For example, when the method of the present invention is utilized to prepare tapes, including medical tapes, both woven, nonwoven, paper and plastic film backings, as well as combinations thereof, can be utilized.

The coating advantages obtained by the method of the present invention depend upon a number of factors, including the specific hydrophobic adhesive polymer, transient polar processing aid, and coating die employed, the quantity of processing aid used, the degree of mixing of these components, and the coating temperatures and pressures employed. Preferably, the transient polar processing aid is incorporated into the hydrophobic adhesive polymer at superatmospheric pressures. The specific pressure employed will depend upon the hydrophobic adhesive polymer employed, and the amount of processing aid to be added. However, in general, it is preferable to maintain the extruder and coating die at pressures of from about 0.5 mega Pascals (MPa) to about 20 MPa, more preferably from about 1 MPa to about 10 MPa, and most preferably from about 2 MPa to about 6 MPa. Addition or injection of the transient polar processing aids at these pressures generally ensures that the transient polar processing aids remain in liquid form when combined, or brought in contact, with the hydrophobic adhesive polymer. This in turn provides a more exacting means of determining and regulating the quantity of the transient polar processing aid added with the hydrophobic adhesive polymer to be hot-melt coated according to the present invention. In addition, it is also within the scope of the method of the present invention to add the transient polar processing aid at, or below, atmospheric pressures. However, in such instances, the transient polar processing aid is often added in vapor form. Thus, the ability to exactly determine and regulate the amount of transient polar processing aid combined or in contact with hydrophobic adhesive polymer is often lost.

As with the pressures employed, the specific temperatures used in the hot-melt coating method according to the present invention will depend on the embodiment or aspect of the present invention to be practiced, the chosen materials, the pressures employed, and the desired coating speed, among other factors. More importantly, inclusion of the transient polar processing aid can result in a significant reduction in the coating temperature of the hydrophobic adhesive polymer, or adhesive composition, below that observed when hot-melt coating the same hydrophobic adhesive polymer in the absence of a transient polar processing aid. For example, when coating the preferred suspension-polymerized acrylate pressure-sensitive adhesive copolymer with about 2.7% by weight of water as a transient polar processing aid, and at a pressure of from about 2 MPa to about 3 MPa, a coating temperature reduction of at least 40° C. (e.g. an about 24% reduction from about 170° C. to about 130° C.) can be obtained. In general, utilization of the method of the present invention can be used to reduce the coating temperature of hydrophobic adhesive polymers by up to fifty percent (50%), or more, relative to the temperatures required to hot-melt coat these same hydrophobic adhesive polymers in the absence of transient polar processing aids. This in turn can reduce, or completely eliminate, thermal degradation, and the resulting high-temperature coating defects, in the final hydrophobic adhesive coating.

While the addition of a transient polar processing aid to a hydrophobic adhesive polymer can be used to directly lower the hot-melt coating temperature of that hydrophobic adhesive, or adhesive composition, it can also be used to modify the coating characteristics of those materials at a pre-determined set temperature. For example, it may be desirable to maintain the extruder and coating die at a temperature well below the point where the hydrophobic adhesive polymer will undergo thermal degradation. However, as previously noted, these lower temperatures often lead to low-temperature coating defects, such as melt flow lines, translucent coloration, a shark skin appearance, and other coating irregularities. Addition of a transient polar processing aid according to the method of the present invention can lower the melt viscosity of the hydrophobic adhesive polymer, or adhesive composition, and thereby reduce or eliminate these coating defects.

For example, hot-melt coating of GELVA TM 737 resin, a hydrophobic pressure-sensitive adhesive copolymer of ethylhexyl acrylate/vinyl acetate/ethyl acrylate (Monsanto Co., St. Louis, Mo.), at a temperature of 150° C., and pressures between about 2.1 MPa to about 2.4 MPa, in the absence of a transient polar processing aid, results in an adhesive coating with a very irregular surface, and visible melt flow lines. Addition of increasing amounts of water as a transient polar processing aid reduces, and eventually eliminates, these coating defects, when 3.5% by weight of water is injected along with the molten adhesive prior to hot-melt coating. Thus, the method of the present invention can be used to eliminate both high-temperature and low-temperature coating defects.

Virtually any type of extrusion equipment, including both twin- and single-screw extruders can be used to feed and melt the hydrophobic adhesive polymers prior to coating by the method of the present invention. Preferably, the method of the present invention uses a single-screw extruder with an appropriate coating die attached thereto. In this regard, the selection of the particular extruders and coating dies to be utilized to coat a hydrophobic adhesive polymer according to the method of the present invention will be readily apparent to, and subject to the specific needs of, those skilled in the art. See e.g., "Handbook of Pressure-Sensitive Adhesive Technology", supra, at Chapter 28, pp. 558–573.

An important consideration in the practice of the method of the present invention is where the transient polar processing aid and the hydrophobic adhesive polymer are brought together, relative to the location of vent ports located in the extruder barrel, if any. In particular, if a more exact determination and regulation of the quantity of transient polar processing aid added with the hydrophobic adhesive polymer is needed, the transient polar processing aid should be added at a point in the extruder where essentially none of the aid will dissipate until after the hot-melt coating of the hydrophobic adhesive or adhesive composition. Thus, the transient polar processing aid should preferably be added along with the hydrophobic adhesive polymer in a non-vented extruder, or at a point in the extruder barrel after any vent ports, and before the coating die.

In a preferred embodiment, the present method is utilized to coat substrates used in medical applications, such as tapes, dressings, surgical drapes and electrodes. When coating hydrophobic adhesive polymers for medical applications, certain characteristics are required. For example, the adhesive coating should exhibit little, if any, odor. Problems with objectionable odor can result from an excess of residual volatile components, such as un-reacted monomer, remaining in the adhesive composition after polymerization, or due to thermal degradation of the adhesive during the hot-melt coating process. In addition, these residual volatile components can also present skin sensitivity issues with certain patients. Practice of, or enhancements to, the method of the present invention can be used to reduce these residual components, and thus, help to alleviate both these odor and sensitivity problems.

In the first instance, residual volatile components, such as un-reacted monomers, can be removed by melt devolatilizing (i.e. steam-stripping) the hydrophobic adhesive polymer prior to hot-melt coating. Specific examples of such melt devolatilization methods and equipment are described in M. Mack, "Choosing an Extruder for Melt Devolatilization", *Plastics Engineering*, pp. 47–51 (July 1986), the disclosure of which is herein incorporated by reference. In general, the process consists of repeated injection of steam into the molten adhesive polymer as it travels down the length of an extruder. The injection of steam causes the molten polymer to bubble. At various junctures, a vacuum line, attached to vent ports in the extruder, is used to draw-off residual volatilized monomers that are liberated during the bubbling of the molten polymer. Melt devolatilization can be included along with the practice of any of the embodiments or aspects of the method of the present invention. For example, when hot-melt coating the preferred suspension-polymerized acrylate pressure-sensitive adhesive copolymer, the adhesive copolymer can be first melt devolatilized to remove residual unreacted monomers. Thereafter, a final injection of water, or other transient polar processing aid, without venting, and with or without mixing of the processing aid and hydrophobic adhesive polymer, can be added according to the method of the present invention. Thus, a clear, smooth, and foam-free adhesive-coated product can be obtained, that is substantially free of unwanted residual monomer-odor.

In the second instance, the temperature and/or melt viscosity lowering effect of the method of the present invention reduces, or essentially eliminates, high-temperature coating defects associated with the thermal degradation of the hydrophobic adhesive polymer during hot-melt coating. For example, coating of the preferred suspension-polymerized acrylate pressure-sensitive adhesive copolymer of the present invention without a transient polar processing aid typically results in high-temperature coating defects, such as an objectionable "burnt" odor and/or a brownish discoloration of the adhesive extrudate. However, when this preferred adhesive is coated using water, or another transient polar processing aid, the melt temperature and melt viscosity of the adhesive polymer can be lowered, such that virtually no objectionable burnt odor or discoloration is obtained.

In a further enhancement to the method of the present invention, additives, and in particular, thermally-labile additives, can be incorporated into the adhesive composition separately, or at the same time, as the transient polar processing aid. In particular, utilization of strategically placed injection port(s), connected to high-pressure pumps, can be used to deliver these additives into or adjacent the hydrophobic adhesive or adhesive composition, as detailed in S. Houlihan, "On-Line Additive Injection in the Extrusion Process", *Tappi Proceedings of the 1988 Polymers, Laminations, and Coatings Conference*, pp. 9–11, Tappi Press, Atlanta, Ga. (1988), the disclosure of which is herein incorporated by reference. By taking advantage of the lower coating temperatures produced by the method of the present invention, hot-melt adhesive coatings can be produced which include thermally-labile additives that previously could not be included therein due to their tendency to degrade at conventional hot-melt coating temperatures.

Virtually any additive that can be incorporated into a hydrophobic adhesive polymer utilizing standard solution-coating methods, can be incorporated therein according to the method of the present invention. Though not absolutely necessary, it is preferable that the chosen additive be soluble in, and not complex with, the transient polar processing aid(s) to be used for hot-melt coating of the hydrophobic adhesive polymer. The particular choice of additive to be used will be readily apparent to those skilled in the art, and can include, without limitation, stabilizers, colorants, biological actives, cross-linking agents, and combinations thereof. Furthermore, examples of useful thermally-labile additive include, without limitation, medicaments and anti-microbials, such as chlorohexidine and povidone/iodine, as well as perfumes, cross-linking agents, and other temperature-sensitive reactants.

Advantages of the Invention

To date, the hot-melt coating of hydrophobic adhesive polymers has been less than an ideal process. Typically, a balance has had to be struck between desired properties and undesired side effects resulting from the hot-melt coating process. Hot-melt coating of hydrophobic adhesive polymers at a sufficient temperature to lower their melt viscosity provided a generally smooth adhesive coating, but at the expense of thermal degradation, and its resultant high-temperature coating defects. Conversely, coating at a lower temperature eliminated some of the thermal degradation problems, but resulted in low-temperature coating defects, such as melt flow lines, translucent coloration, and shark skin surfaces, due to an inability to sufficiently lower the melt viscosity of the hydrophobic adhesive polymer.

Similarly, the use of conventional processing aids, and various post-processing treatments have proved less than ideal. Addition of conventional non-volatile processing aids can result in processing aid-induced coating defects. Also, use of water as processing aid for hot-melt coating of hydrophobic adhesive polymers has been strictly avoided due to assumed problems with foaming of the extrudate. Further, as already noted, conventional additives, and post-processing treatments are inconvenient, expensive, and impart often undesirable properties to the resulting adhesive-coated products.

The method of the present invention has alleviated, or completely eliminated, the trade-offs and other problems associated with hot-melt coating of hydrophobic adhesive polymers. Contrary to conventional teaching, the coating of a composition of a transient polar processing aid and a hydrophobic adhesive polymer according to the method of the present invention yields a clear, smooth, and foam-free adhesive coating. Also, the lower coating temperatures and/or melt viscosities are such that both high-temperature and low-temperature coating defects can be eliminated. Furthermore, due to their fugitive nature, the transient polar processing aids do not significantly affect the ultimate properties of the adhesive coating.

The specific advantages resulting from the method of the present invention are numerous. Lack of thermal degradation of the hydrophobic adhesive polymer helps to ensure that the final adhesive coating does not exhibit high-temperature coating defects, such as adhesive discoloration, an objectionable burnt odor, or a significant loss of adhesive or other properties. Also, enhanced melt viscosity profiles can be used to eliminate low-temperature coating defects, such as melt-flow lines, shark skin, and/or translucent coloration. Similarly, the fugitive nature of the transient polar processing aid also helps to ensure that processing aid-induced coating defects will not substantially affect the ultimate properties of the resultant adhesive coating. Furthermore, expensive curing equipment, exotic monomers, and undesirable additives are not needed with the method of the present invention.

The ability of the transient polar processing aid to drop the coating temperature of the adhesive composition, and/or to allow for the coating of the hydrophobic adhesive polymers at a pre-determined, lower coating temperature, means that hot-melt coating of the adhesive composition can be accomplished at lower temperatures, and faster line coating speeds, without a sacrifice in coating quality. This, in turn leads to inherent time efficiencies, as well as energy savings.

The use of water as a transient polar processing aid entails its own advantages above those seen for other transient polar processing aids. Specifically, water is a cheap, safe material that is biologically and environmentally friendly, both to the coating-line operator, and to the ultimate consumer of the coated products. In fact, the advantages of water as a transient polar processing aid are especially important in the preparation of adhesive-coated medical tapes, dressings, and other similar materials, where lack of odor and toxicity are required.

Furthermore, the method of the present invention is very versatile. In particular, a wide variety of coating conditions can be applied, all of which will arrive at a smooth, clear, foam-free adhesive coating, that is also substantially free of high-temperature, low-temperature, and processing aid-induced coating defects. For example, the transient polar processing aid and hydrophobic adhesive polymer can be well mixed to form a substantially uniformly dispersed adhesive composition, not mixed at all, or mixed to any degree in between, and still provide a foam-free hydrophobic adhesive extrudate capable of being coated from virtually any coating die, as long as the hydrophobic adhesive polymer is hot-melt coated at a temperature below the boiling point of the transient polar processing aid at atmospheric pressure. Even should any foaming of the adhesive extrudate occur, a smooth, clear and foam-free coating can still be obtained by use of a contact coating die, such as a wipe-film die.

In addition, any of the embodiments or aspects of the method of the present invention can be combined with melt devolatilization of the hydrophobic adhesive polymer. Use of melt devolatilization with the method of the present invention can substantially reduce volatile components, such as residual monomers, and their attendant odor, from the hydrophobic adhesive polymer prior to hot-melt coating.

A further advantage of the method of the present invention is that thermally labile additives can be added to the hydrophobic adhesive polymer to be coated, without significant thermal breakdown of the material during hot-melt coating. Thus, thermally-labile additives that, to date, could not be incorporated into hot-melt coated hydrophobic adhesive polymers, can now be included therein.

The invention will be further illustrated by reference to the following non-limiting Examples. All parts and percentages are expressed as parts by weight unless otherwise indicated.

EXAMPLE 1

An adhesive copolymer of isooctyl acrylate (IOA) and methacrylic acid (MAA) in a 96:4 weight ratio, and with an equilibrium water content of about 0.22% by weight at ambient conditions, was prepared according to the procedures disclosed in U.S. Pat. No. 4,952,650, Example No. 5. After polymerization, the adhesive copolymer was spread on a silicone release liner and allowed to dry under ambient conditions. The dried adhesive copolymer was removed from the release liner and rolled into a rope.

The adhesive copolymer rope was fed into a Haake-Buchler RHEOCORD TM System 40 extruder, equipped with a 190 mm diameter screw and a 5.1 cm wipe-film die extrusion coating head (Haake-Buchler Instruments, Inc., Saddlebrook, N.J.). In addition, the extruder was modified to accommodate the precise injection of water, or other transient polar processing aids, adjacent the melted adhesive by connecting the output line from a Model 6000A liquid chromatography pump (Waters Chromatography Division, Millipore Corp., Milford, Mass.) to an injection port located on the extruder barrel, near the end of the screw, and just prior to the neck section of the extrusion coating die so that there was minimal, if any mixing of the adhesive copolymer and water. The injection port was designed so that there was no leakage of either the melted extrudate or pressurized water. Upon exiting the wipe-film coating die, the molten IOA:MAA adhesive was coated onto a polyethylene terephthalate (PET) backing material at a thickness of 0.1 mm, and a delivery rate of approximately 15 g/min. Thereafter, the coated IOA/MAA adhesive copolymer returned to its equilibrium water content of about 0.22% by weight at ambient conditions.

The temperature of the inlet and feed sections, representing approximately the first two-thirds of the extruder, were adjusted as need be to permit uniform feeding of the IOA:MAA adhesive copolymer into and through the extruder. The temperature of the later third of the extruder and the wipe-film coating die were maintained at three set temperatures of approximately 130° C., 150° C., or 170° C. A baseline value without water injection was established at each of these temperatures. Thereafter, increasing amounts of water were injected along with the melted adhesive by adjusting the flow rate on the chromatography pump. The effect of water injection on the appearance of the coated adhesive film was observed, with particular attention being paid to the presence or absence of melt-flow lines, the smoothness of the coated adhesive film, and the translucency or transparency of the adhesive coating. Table 1 illustrates coating temperatures, pressures, and the effect of water addition on the appearance of the hot-melt coated IOA/MAA adhesive copolymer of Example 1.

Examination of the data in Table 1 indicates that, absent the addition of water, higher extrusion temperatures are required to enhance the flow properties of the IOA:MAA adhesive copolymer, and thereby reduce melt flow lines, and otherwise improve the appearance of the adhesive coating. In fact, without the addition of water, a temperature of greater than 170° C. is needed to hot-melt coat the IOA:MAA adhesive copolymer. However, even at a temperature of 170° C., when no water is added, the IOA/MAA adhesive copolymer is undergoing thermal degradation, as evidenced by a noticeable burnt odor emanating from the resulting adhesive coating, and a brownish discoloration of the extruded adhesive. Furthermore, subjecting the adhesive copolymer to the higher temperatures required to obtain a smooth adhesive coating, would result in further significant thermal degradation of the adhesive copolymer, as evidenced by discoloration, a burnt odor, as well as probable loss of adhesive properties.

In contrast to these thermal degradation problems, the results of Table 1 show that the addition of water as a transient polar processing aid significantly reduces the temperature needed to obtain a clear coating with the adhesive copolymer of Example 1. For example, the addition of 2.7% by weight water, above the equilibrium water content of the IOA:MAA adhesive copolymer, yields a clear coating, essentially free of melt-flow lines or other coating irregularities at all of the coated temperatures. In addition, a coating temperature reduction of at least 40° C., from 170° C. without water to 130° C. with 2.7% by weight water, can be obtained and used to provide a smooth, clear, and foam-free adhesive coating that is essentially free of thermal degradation. Also, the addition of any level of water at 170° C. virtually eliminated the burnt odor and brownish discoloration characteristic of the adhesive when coated without water. Quite unexpectedly, no foaming of the extruded adhesive was observed from the die orifice, at the coating die/backing interface, or in the coated adhesive product. However, when water addition was stopped, and the waterless melt extrusion equilibrium allowed to reestablish, melt flow lines and other low-temperature coating defects reappeared in the coated adhesive film.

TABLE 1

Coating temperatures, pressures, and effect of water addition on the appearance of the coated IOA:MAA adhesive copolymer of Example 1.

| Temp. (°C.) | Percent by Weight Water Addition | | | | |
|---|---|---|---|---|---|
| | 0% | 0.7% | 1.3% | 2% | 2.7% |
| 130 | Whitish Translucent, Surface Irregular, | Less Translucent, No Shark Skin, Reduced | Improved Coating Clarity and Smoothness | Substantially Clear, Smooth Coating | Clear, Smooth Coating |

TABLE 1-continued

Coating temperatures, pressures, and effect of water addition on the appearance of the coated IOA:MAA adhesive copolymer of Example 1.

| Temp. (°C.) | Percent by Weight Water Addition | | | | |
|---|---|---|---|---|---|
| | 0% | 0.7% | 1.3% | 2% | 2.7% |
| | Shark Skin, Visible Melt Flow Lines | Melt Flow Lines | | | |
| 150 | Whitish Translucent, Visible Melt Flow Lines | Less Translucent, Reduced Melt Flow Lines | Improved Coating Clarity and Smoothness | Quite Clear and Smooth Coating | Clear, Smooth Coating |
| 170 | Whitish Translucent, Noticeable Burnt Odor, Discolored[a] | Clearer, Smooth Coating | Quite Clear and Smooth Coating | Clear, Smooth Coating | Clear, Smooth Coating |
| Pressure at 150° C. (MPa) | 2.6 | 2.1 | 2.0 | 2.0 | 2.0 |

[a] Brownish discoloration observed by collecting adhesive extrudate in a pan to a depth of approximately 5 cm.

EXAMPLE 2

A pressure-sensitive adhesive composition, with an equilibrium water content of about 0.12% by weight at ambient conditions, and consisting of 50 parts by weight of KRATON ™ resin (a styrene/isoprene/styrene block copolymer; Shell Chemical Co., Houston, Tex.), 50 parts by weight of WINGTACK PLUS ™ (an aliphatic resin tackifier; Goodyear Tire and Rubber Co., Chemical Division, Akron, Ohio), and 1.5 parts by weight of IRGANOX ™ 1076 (an antioxidant, comprised of octyldecyl 3-(3,5-di-tert-butyl-4-hydroxyphenyl) propionate; Ciba Geigy Corp., Hawthorne, N.Y.) was prepared by melt blending the components in the indicated weight ratios in a twin screw extruder maintained at 155° C., utilizing melt blending techniques as described in the "Encyclopedia of Polymer Science and Engineering", Vol 6, pp. 617–629, John Wiley & Sons, New York, N.Y. (1990). The adhesive extrudate was collected in a silicone lined box, and cut into strips to facilitate feeding into the extruder and coating die described in Example 1 above. Table 2 shows the coating conditions at 150° C., and their effect on the coating appearance at various percent additions of water for the pressure-sensitive adhesive of Example 2.

TABLE 2

Coating conditions at 150° C., and their effect on the coating appearance at various percent additions of water for the pressure-sensitive adhesive of Example 2.

| Temp. (°C.) | Percent by Weight Water Addition | | | |
|---|---|---|---|---|
| | 0% | 0.5% | 2.5% | 4% |
| 150 | Visible Melt Flow Lines | Clear, Smooth Coating | Clear, Smooth Coating | Clear, Smooth Coating |
| Pressure (MPa) | 3.6 | 3.7 | 3.8 | 4.0 |

Coating the KRATON ™-based pressure-sensitive adhesive onto a PET film at a thickness of approximately 0.12 mm produced a clear film containing visible melt flow lines. Upon injection of water into the adhesive, a clear adhesive film with no melt flow lines was produced. Thereafter, the adhesive coating returned to its equilibrium water content of about 0.12% by weight at ambient conditions. No foaming was observed at the coating die/PET film backing interface, or on the adhesive-coated film. However, when the adhesive extrudate was not coated, but instead allowed to freely drop from the die, some water drops or bubbles were observed within the adhesive film, indicating that water was being injected along with the hydrophobic adhesive polymer, and was exiting the extruder via the wipe-film extrusion coating die.

EXAMPLE 3

A polyisobutylene based pressure-sensitive adhesive composition, with an equilibrium water content of about 0.1% by weight at ambient conditions, was prepared according to the procedure disclosed on page 291 of *The Handbook of Pressure-Sensitive Adhesive Technology*, D. Satas, ed., Van Nostrand Reinhold Co., New York, N.Y., (1982). In particular, the adhesive was prepared by adding 100 parts by weight of VISTANEX ™ MM L-110 (a polyisobutylene homopolymer; approximate molecular weight=1,100,000; Exxon Chemical Co., Houston, Tex.) and 75 parts by weight of VISTANEX ™ LM-MS (a polyisobutylene homopolymer; approximate molecular weight=44,000; Exxon Chemical Co.) into toluene, to yield an about 20% solids pressure-sensitive adhesive composition. This adhesive composition was coated onto a silicone release liner, and dried in a circulating air oven at approximately 100° C. for about 12 minutes to produce the dried adhesive. The dried adhesive was removed from the release liner, rolled into a rope and fed into the extruder and coating die described in Example 1 above. Coating conditions at 150° C., and their effect on the coating appearance at various percent additions of water for the pressure-sensitive adhesive of Example 3 are shown below in Table 3.

TABLE 3

Coating conditions at 150° C., and their effect on the coating appearance at various percent additions of water for the pressure-sensitive adhesive of Example 3.

| Temp. (°C.) | Percent by Weight Water Addition | | | |
|---|---|---|---|---|
| | 0% | 1.3% | 2.6% | 4% |
| 150 | Whitish Translucent Visible Melt Flow Lines | More Transparent, Reduced Melt Flow Lines | Reduced Melt Flow Lines | Quite Clear, Smooth Coating |
| Pressure (MPa) | 5.6 | 5.9 | 5.9 | 6.1 |

Extrusion of the polyisobutylene pressure-sensitive adhesive without water injection at approximately 150° C. produced a whitish, translucent coating, with visible melt-flow lines on the PET film backing. However, with injection of approximately 4% water by weight essentially eliminated the melt-flow lines, and produced a transparent coating with no moisture bubbles. The extruded adhesive was then allowed to fall freely from wipe-film die lip during water injection as in Example 2. The resulting adhesive extrudate included randomly dispersed moisture drops and or bubbles within the extrudate.

EXAMPLE 4

A rubber-based, precompounded adhesive resin (No. 820-338-BE Hot-Melt Adhesive; Findley Adhesives, Inc., Wauwatosa, Wis.), with an equilibrium water content of about 0.24% by weight at ambient conditions, was cut into strips and fed into the extruder and coating die as described in Example 1 above. Coating conditions at 150° C., and their effect on the coating appearance at various percent additions of water for the adhesive resin of Example 4 are shown below in Table 4.

TABLE 4

Coating conditions at 150° C., and their effect on the coating appearance at various percent additions of water for the rubber adhesive resin of Example 4.

| Temp. (°C.) | Percent by Weight Water Addition | | | |
|---|---|---|---|---|
| | 0% | 1.3% | 2.6% | 3.9% |
| 150 | Visible Melt Flow Lines | Reduced Melt Flow Lines | Clear, Smooth Coating | Clear, Smooth Coating |
| Pressure (MPa) | 2.1 | 1.8 | 1.9 | 1.9 |

As with the previous Examples, hot-melt coating of the adhesive of Example 4 without water produced a adhesive coating with visible melt flow lines. However, upon adding approximately 2.6% to about 4% by weight of water as a transient polar processing aid, a smooth adhesive coating with no melt flow lines, foaming, or other coating irregularities, was produced.

EXAMPLE 5

GELVA TM 737 resin, a pressure-sensitive adhesive copolymer of ethylhexyl acrylate/vinyl acetate/ethyl acrylate (available as a 30% solids solution; Monsanto Co., St. Louis, Mo.), with an equilibrium water content of about 0.12% by weight at ambient conditions, was coated onto a release liner, and dried under ambient conditions. The dried adhesive was removed from the release liner, rolled into a rope, and fed into the extruder and wipe-film coating die described in Example 1 above. Coating conditions at 150° C., and their effect on the coating appearance at various percent additions of water for the adhesive resin of Example 5 are shown below in Table 5.

TABLE 5

Coating conditions at 150° C., and their effect on the coating appearance at various percent additions of water for the pressure-sensitive adhesive of Example 5.

| Temp. (°C.) | Percent by Weight Water Addition | | | |
|---|---|---|---|---|
| | 0% | 1.1% | 2.3% | 3.5% |
| 150 | Surface Very Irregular, Visible Melt Flow Lines | Reduced Melt Flow Lines | Few Melt Flow Lines | Clear, Smooth Coating |
| Pressure (MPa) | 2.4 | 2.2 | 2.1 | 2.1 |

Hot-melt coating of the hydrophobic pressure-sensitive adhesive polymer of Example 5, without water as a transient polar processing aid, produced an adhesive coating with numerous coating defects. The addition of approximately 3.5% water by weight significantly reduced these coating defects, and produced a uniform clear, and foam-free adhesive coating.

EXAMPLE 6

The IOA/MAA adhesive of Example 1 was extruded onto PET backings at a temperature of 150° C., and 1.8 MPa, and at varying percent by weight additions of water, according to the procedure of Example 1. To demonstrate that water, as a transient polar processing aid, did not affect the ultimate properties of the resulting adhesive coating, each of the Example coated backings was tested for shear strength on a stainless steel plate according to the procedures of ASTM D3654-88. Six samples of each coated backing were tested at each water addition level. The percent by weight of water added as a transient polar processing aid, and the average shear time in minutes for each of the Example coated backings are shown below in Table 6.

TABLE 6

Percent by weight of water added as a transient polar processing aid, and the average shear time in minutes for each of the coated backings of Example 6.

| Percent by Weight Water Addition | Average Shear Time (min) |
|---|---|
| 0 | 1446 |
| 1.3 | 1521 |
| 4.2 | 1059 |
| 6.9 | 1136 |

Analysis of the data illustrated in Table 6 showed no significant difference in shear strength between any of the Sample coated backings. Thus, addition of water as a transient polar processing aid during hot-melt coating according to the method of the present invention does not have a noticeable affect on the ultimate adhesive properties of the resulting adhesive coating.

EXAMPLE 7

The IOA/MAA adhesive of Example 1 was extruded onto a PET backing at a temperature of 150° C., and 1.8 MPa, according to the procedure of Example 1, except that 0.7% by weight of a 1:1 (volume:volume) solution of methanol and water, rather than solely water, was injected into the extruder along with the adhesive material prior to coating. As in Example 1, prior to injection of the processing aid, the coated film was translucent, and contained visible melt-flow lines, as well as other coating irregularities. However, after injection of the processing aid, the extruded adhesive film was clear, smooth, and free from melt-flow lines or other irregularities. Further, although the extruder and die temperatures were above the boiling point of both the water and methanol, no evidence of melt instability, such as foaming of the adhesive extrudate from the coating die orifice, was observed.

EXAMPLE 8

The IOA/MAA adhesive of Example 1 was coated onto a PET backing at a temperature of 150° C., and 1.9 MPa, according to the procedure of Example 1, except that 0.07% by weight of a 5% by weight solution of chlorohexidine acetate (a thermally labile antimicrobial) in methanol was injected into the adhesive prior to coating. After injection, the resulting adhesive-coated backing was smooth, clear, and free of coating defects. Solvent vapors were observed emanating from the extrudate, but no formation of foam in the adhesive extrudate, or in the adhesive coating was observed. In addition, no discoloration, fuming, odor, or other evidence of thermal degradation of the chlorohexidine acetate was observed. Furthermore, after cooling, the adhesive coated backing was analyzed for the presence of p-chloroaniline, a toxic by-product resulting from the thermal decomposition of chlorohexidine acetate, utilizing gas chromatography. No evidence of this decomposition product was found in the hot-melt coated adhesive film at a sensitivity level of 1 ppm.

EXAMPLE 9

An approximately 40% solids suspension of the IOA/MAA adhesive copolymer of Example 1 was pumped into an 8.9 cm diameter, 1.5 m length, continuous-screw extrusion press, compressed, and de-watered to approximately 95% solids. The de-water adhesive copolymer composition was piped into an 8.9 cm, 1.5 m length, single-screw extruder modified to also serve as a melt devolatilizer. After being fed into the heated extruder, the IOA/MAA adhesive copolymer was melt devolatilized under a starve feed condition to remove unreacted residual monomers. Throughout the melt devolatilization (e.g. steam-stripping) process, the temperature of the devolatilizer barrel was maintained between approximately 132° C. to 143° C.

During melt devolatilization, approximately 5% to 10% by weight water was injected into the molten adhesive polymer through an injection port located approximately 30 cm downstream from the adhesive feed port on the barrel of the melt devolatilizer. The injected water was metered into the devolatilizer barrel using a precision calibrated pump. Thereafter, a vacuum of approximately 25 mm was applied at three vent ports, located at approximately 15 cm, 64 cm, and 106 cm downstream from the water injection port, to remove the volatilized-residual unreacted monomers present in the molten hydrophobic adhesive composition.

At approximately 15 cm from the end of the devolatilizer barrel, a final injection of 2.5% by weight of water as a transient polar processing aid was made into the molten adhesive polymer without venting. Thereafter, the water and IOA/MAA adhesive copolymer were mixed into a substantially uniformly dispersed adhesive composition, through at least in part, the action of mixing pins attached to the screw of the melt devolatilizer, and a screen filter located thereafter. A gear pump attached to the output end of the devolatilizer barrel by a heated pipe delivered the processing aid-containing adhesive composition to a wipe-film coating die, maintained at a temperature of 138° C. for hot-melt coating of the adhesive composition onto a film backing (polyethylene/vinyl acetate copolymer film; NA443-003, Quantum Chemical Co., Cincinnati, Ohio; or ESCORENE ™ LD-312.09 backing, Exxon Chemical Co., Houston, Tex.) at a rate of 1.8 kg/hour/2.5 cm die width. The resulting adhesive-coated film had an average thickness of approximately 0.05 mm.

Immediately after coating, the adhesive coating had a milky colored appearance, that rapidly became transparent. Vaporization of the water was apparent from the steam escaping from the orifice of the coating die. Upon cooling, a clear, smooth, foam-free adhesive coating, free from high-temperature, low-temperature, and processing aid-induced coating defects, was obtained. However, when the film backing was removed from contact with the wipe-film coating die, some foaming of the adhesive extrudate was observed at the die orifice.

EXAMPLE 10

The hot-melt coating of the IOA/MAA adhesive copolymer of Example 1 was repeated utilizing the equipment and procedures of Example 9, except that no water was added as a transient polar processing aid prior to the hot-melt coating of the molten adhesive. The molten adhesive was coated onto the same film backing material of Example 9, at a coating temperature of about 138° C., at about 13.8 MPa, and a coating rate of approximately 0.225 kg/hour/2.5 cm die width. The resulting adhesive coating was of nonuniform width, and contained open gaps and visible melt-flow lines.

EXAMPLE 11

The hot-melt coating of the IOA/MAA adhesive copolymer of Example 1 was repeated utilizing the equipment and procedures of Example 9, including the final injection of 2.5% by weight of water as a transient polar processing aid prior to the hot-melt coating of the molten adhesive. The molten adhesive was coated onto the same film backing material of Example 9, at a coating temperature of 138° C., at about 4 MPa, and a coating rate of approximately 7.8 kg/hour/2.5 cm die width. The resulting adhesive coating was smooth, clear, foam-free, and free of other coating defects.

EXAMPLE 12

The hot-melt coating of the IOA/MAA adhesive copolymer of Example 1 was repeated utilizing the equipment and procedures of Example 9, except that 5% by weight of water was injected as a transient polar processing aid prior to the hot-melt coating of the molten adhesive. The molten adhesive was coated onto the same film backing material of Example 9, at a coating temperature of 138° C., at about 2.8 MPa, and a coating rate of approximately 3.6 kg/hour/2.5 cm die width. Except for the occurrence of free water under the lip of the wipe film die, the resulting adhesive coating was essentially smooth, uniform, and free of foam and other coating defects. Furthermore, any irregularities due to excess free water could be eliminated by a vacuum siphon maintained under the lip of the wipe film die to siphon off excess free-water escaping from the wipe-film coating die.

EXAMPLE 13

The hot-melt coating of the IOA/MAA adhesive copolymer of Example 1 was repeated utilizing the equipment and procedures of Example 9. As in Example 9, the adhesive copolymer composition was fed into the melt devolatilizer from the continuous-screw extrusion press with 5% by weight of residual water from the polymerization of the copolymer as a transient polar processing aid. However, in this Example, the melt devolatilizer was only used as a mechanism to convey the adhesive and water composition to a draw-film coating die. Thus, the melt devolatilizer was maintained at a temperature of 66° C., and no residual monomers were removed. No foaming of the extruded adhesive composition was observed at the coating die orifice.

The hydrophobic adhesive composition was hot-melt coated at a temperature of 66° C., a pressure of 8.5 MPa, a coating rate 17 kg/hr/2.5 cm die width, and a coating speed of 1.5 m/min, to yield an approximate 0.04 mm thick adhesive coating on the same film backing as that of Example 9. This adhesive coating was clear and free of any surface irregularities, including foam or bubbles. Further, due to the low hot-melt coating temperatures, no significant high-temperature coating defects were observed.

EXAMPLE 14

The IOA/MAA adhesive copolymer of Example 1 was coated as described in Example 1, except that a coating temperature of 90° C. was used, and the adhesive extrudate was coated from a draw film coating die onto the PET backing of Example 1. The orifice of the coating die was maintained approximately 4 cm from the PET backing roll, which was moving at a speed of approximately 10 m/min. The coating conditions at 90° C., and their effect on the coating appearance at various percent additions of water for the pressure-sensitive adhesive of Example 14 are shown in Table 7 below.

TABLE 7

Coating conditions at 90° C., and their effect on the coating appearance at various percent additions of water for the pressure-sensitive adhesive of Example 14.

| Temp. (°C.) | Percent by Weight Water Addition | | | |
|---|---|---|---|---|
| | 0% | 1.4% | 2.7% | 4.2% |
| 90 | Transluc. Visible Melt Flow Lines | Clearer Coating, Some Melt Flow Lines | Clearer, Smooth Coating | Clear, Smooth Coating |
| Pressure (MPa) | 3.6 | 3.7 | 3.8 | 4.0 |

In addition, six samples of each of the coated backings of this Example were tested for comparative shear strength utilizing ASTM D3654-88, as provided in Example 6 herein. The percent by weight of water added as a transient polar processing aid, and the average shear time in minutes for each of the Example coated backings are shown below in Table 8.

TABLE 8

Percent by weight of water added as a transient polar processing aid, and the average shear time in minutes for each of the coated backings of Example 14.

| Percent by Weight Water Addition | Average Shear Time (min) |
|---|---|
| 0 | 549 |
| 1.4 | 570 |
| 2.7 | 535 |
| 4.2 | 432 |

The results of Table 7 indicate that IOA/MAA adhesive copolymer of Example 1 can be hot-melt coated at a temperature below the boiling point of water external to the coating die, and still provide a foam-free extrudate, and a clear, smooth, foam-free, and coating defect free adhesive coating through the addition of water along with the molten adhesive copolymer. Furthermore, the results of Table 8 show that there is no significant difference in shear strength between the sample coated backings, and thus, use of water as a transient polar processing aid did not substantially affect the ultimate properties of the resulting adhesive coatings.

EXAMPLE 15

An approximately 40% solids adhesive composition of IOA and MAA in a 96:4 weight ratio was prepared according to the procedures disclosed in U.S. Pat. No. 4,833,179, Example No. 10, except that a mixture of 372 g of IOA, 12 g of polystyryl methacrylate, 16 g of MAA, and 2 g of ZnO was used as the monomer charge.

One portion of the adhesive copolymer was dewatered to about 5% by weight water and hot-melt coated with a wipe-film coating die at a temperature of 88° C. onto a biaxial oriented polypropylene (BOPP) backing at a 7 grain coating weight. Another portion of the adhesive copolymer was dried at ambient conditions, dissolved in ethyl acetate, solution coated onto a BOPP backing at a 7 grain coating weight, and dried in an oven at 65° C. for 30 minutes.

Three samples each of both the hot-melt coated and solution-coated BOPP backings were tested for the shear strength of the adhesive coatings according to the procedures of Example 6. The average shear strength of the hot-melt coated adhesive coatings was 95 minutes, while the average shear strength of the solution-coated adhesive coatings was 83 minutes. Thus, there was no significant difference in the shear strength of the IOA/-MAA adhesive copolymer hot-melt coated with water as a transient polar processing aid, and the same adhesive copolymer coated by conventional solution coating techniques.

EXAMPLE 16

The KRATON ™ 1107 resin adhesive copolymer of Example 2 was hot-melt coated using the equipment and procedures of Example 1, except that the injection port for the addition of water as a transient polar processing aid was moved to a point in the extruder barrel that was approximately half-way between the extruder feed port and the entrance to the wipe film coating die. This earlier injection of water allowed for more thorough mixing of the adhesive copolymer and water prior to the hot-melt coating of the adhesive composition. In addition, the extruder barrel temperatures were set at 100° C., 125° C., and 150° C., and the coating die was maintained at 150° C., throughout the hot-melt coating process.

Prior to hot-melt coating, uniform mixing of the water and adhesive copolymer was checked by injecting 1.5% by weight water into the extruder, and examining the adhesive extrudate as it dropped from the die orifice. Moisture bubbles were visually apparent and uniformly dispersed throughout the adhesive extrudate, and steam was observed escaping from the die orifice.

The backup roll holding the PET backing material was brought into pressure contact with the wipe-film die, and hot-melt coated with the adhesive composition. Table 9 shows the coating conditions at 150° C., and their effect on the coating appearance at various percent additions of water for the pressure-sensitive adhesive of Example 16.

TABLE 9

Coating conditions at 150° C., and their effect on the coating appearance at various percent additions of water for the pressure-sensitive adhesive of Example 16.

| Temp. (°C.) | Percent by Weight Water Addition | | | |
| --- | --- | --- | --- | --- |
| | 0% | 1% | 2% | 3.5% |
| 150 | Visible Melt Flow Lines | Clear, Smooth Coating | Clear, Smooth Coating | Clear, Smooth Coating |
| Pressure (MPa) | 3.9 | 4.5 | 4.7 | 4.6 |

Coating the KRATON ™ -based pressure-sensitive adhesive onto a PET film at produced a clear film containing visible melt flow lines. Upon injection of water into the adhesive to form an adhesive composition, a clear adhesive film with no melt flow lines was produced. No foaming was observed at the coating die/-PET film backing interface, or on the adhesive-coated film. However, tiny moisture droplets were observed on the surface of the coated film, but no moisture droplets were observed within the film. These moisture droplets completely evaporated by the time the coated PET backing was 50 cm from the coating die. Thereafter, the water injection was discontinued. After approximately 15–20 minutes, the adhesive coating again displayed visible melt flow lines.

While in accordance with the patent statutes, description of the preferred weight fractions, and processing conditions have been provided, the scope of the invention is not to be limited thereto or thereby. Various modifications and alterations of the present invention will be apparent to those skilled in the art without departing from the scope and spirit of the present invention.

Consequently, for an understanding of the scope of the present invention, reference is made to the following claims.

What is claimed is:

1. A method of coating an adhesive polymer comprising hot-melt coating an adhesive composition of a hydrophobic adhesive polymer and a transient polar processing aid from an orifice of a coating die onto a substrate, wherein the transient polar processing aid comprises at least 0.5 percent by weight above the weight of residual water present in the hydrophobic adhesive polymer equilibrated at ambient conditions, and wherein the composition is hot-melt coated at a temperature below the boiling point of the transient polar processing aid at atmospheric pressure.

2. A method of coating an adhesive polymer according to claim 1, wherein the transient polar processing aid is selected from the group consisting of water, methanol, ethanol, isopropanol, and combinations thereof.

3. A method of coating an adhesive polymer according to claim 1, wherein the transient polar processing aid comprises from about 0.5 percent to about 10 percent by weight above the weight of residual water present in the hydrophobic adhesive polymer equilibrated at ambient conditions.

4. A method of coating an adhesive polymer according to claim 1, wherein the transient polar processing aid comprises from about 1 percent to about 5 percent by weight above the weight of residual water present in the hydrophobic adhesive polymer equilibrated at ambient conditions.

5. A method of coating an adhesive polymer according to claim 1, wherein the hydrophobic adhesive polymer comprises a hydrophobic pressure-sensitive adhesive polymer.

6. A method of coating an adhesive polymer according to claim 5, wherein the hydrophobic pressure-sensitive adhesive polymer exhibits a glass transition temperature of 20° C. or less.

7. A method of coating an adhesive polymer according to claim 6, wherein the hydrophobic pressure-sensitive adhesive polymer exhibits a glass transition temperature of 0° C. or less.

8. A method of coating an adhesive polymer according to claim 5, wherein the hydrophobic pressure sensitive adhesive polymer is selected from the group consisting of an acrylate pressure-sensitive adhesive polymer, a rubber-based pressure-sensitive adhesive polymer, an olefin pressure-sensitive adhesive polymer, a polysiloxane pressure-sensitive adhesive polymer, and combinations thereof.

9. A method of coating an adhesive polymer according to claim 8, wherein the acrylate pressure-sensitive adhesive polymer is formed by suspension polymerization, emulsion polymerization, or solvent polymerization.

10. A method of coating an adhesive polymer according to claim 9, wherein the suspension polymerized acrylate pressure-sensitive adhesive polymer comprises an acrylate pressure-sensitive adhesive copolymer of an acrylic acid ester monomer selected from the group consisting of isooctyl acrylate, isononyl acrylate, 2-ethylhexyl acrylate, butyl acrylate, and combinations thereof, and at least one other monomer selected from the group consisting of acrylic acid, methacrylic acid, N-vinyl pyrrolidone, vinyl acetate, acrylamides, substituted acrylamides, and combinations thereof.

11. A method of coating an adhesive polymer according to claim 10, wherein the transient polar processing aid comprises water, and the composition is hot-melt coated at a temperature of less than 100° C. at atmospheric pressure.

12. A method of coating an adhesive polymer according to claim 1, wherein the coating die comprises a wipe-film coating die, a draw die, a drop-film die, a slot-orifice die, or a roll coater die.

13. A method of coating an adhesive polymer comprising hot-melt coating an adhesive composition of a hydrophobic adhesive polymer and a transient polar processing aid from an orifice of a contact coating die onto a substrate, wherein the transient polar processing aid comprises at least 0.5 percent by weight above the weight of residual water present in the hydrophobic adhesive polymer equilibrated at ambient conditions, and wherein the composition is hot-melt coated at a temperature at or above the boiling point of the processing aid at atmospheric pressure.

14. A method of coating an adhesive polymer according to claim 13, wherein the transient polar processing aid is selected from the group consisting of water, methanol, ethanol, isopropanol, and combinations thereof.

15. A method of coating an adhesive polymer according to claim 13, wherein the transient polar processing aid comprises from about 0.5 percent to about 10 percent by weight above the weight of residual water present in the hydrophobic adhesive polymer equilibrated at ambient conditions.

16. A method of coating an adhesive polymer according to claim 13, wherein the transient polar processing aid comprises from about 1 percent to about 5 percent by weight above the weight of residual water present in the hydrophobic adhesive polymer equilibrated at ambient conditions.

17. A method of coating an adhesive polymer according to claim 13, wherein the hydrophobic adhesive polymer comprises a hydrophobic pressure-sensitive adhesive polymer.

18. A method of coating an adhesive polymer according to claim 17, wherein the hydrophobic pressure-sensitive adhesive polymer exhibits a glass transition temperature of 20° C. or less.

19. A method of coating an adhesive polymer according to claim 18, wherein the hydrophobic pressure-sensitive adhesive polymer exhibits a glass transition temperature of 0° C. or less.

20. A method of coating an adhesive polymer according to claim 18, wherein the hydrophobic pressure sensitive adhesive polymer is selected from the group consisting of an acrylate pressure-sensitive adhesive polymer, a rubber-based pressure-sensitive adhesive polymer, an olefin pressure-sensitive adhesive polymer, a polysiloxane pressure-sensitive adhesive polymer, and combinations thereof.

21. A method of coating an adhesive polymer according to claim 20, wherein the acrylate pressure-sensitive adhesive polymer is formed by suspension polymerization, emulsion polymerization, or solvent polymerization.

22. A method of coating an adhesive polymer according to claim 20, wherein the suspension polymerized acrylate pressure-sensitive adhesive polymer comprises an acrylate pressure-sensitive adhesive copolymer of an acrylic acid ester monomer selected from the group consisting of isooctyl acrylate, isononyl acrylate, 2-ethylhexyl acrylate, butyl acrylate, and combinations thereof, and at least one other monomer selected from the group consisting of acrylic acid, methacrylic acid, N-vinyl pyrrolidone, vinyl acetate, acrylamides, substituted acrylamides, and combinations thereof.

23. A method of coating an adhesive polymer according to claim 22, wherein the transient polar processing aid comprises water, and the composition is hot-melt coated at a temperature of at least 100° C. at atmospheric pressure.

24. A method of coating an adhesive polymer according to claim 13, wherein the contact coating die comprises a wipe-film coating die.

25. A method of coating an adhesive polymer comprising hot-melt coating a hydrophobic adhesive polymer and a transient polar processing aid from an orifice of a coating die onto a substrate, wherein the transient polar processing aid comprises at least 0.5 percent by weight above the weight of residual water present in the hydrophobic adhesive polymer equilibrated at ambient conditions, and wherein the hydrophobic adhesive polymer and the transient polar processing aid are not substantially mixed prior to hot-melt coating of the hydrophobic adhesive polymer.

26. A method of coating an adhesive polymer according to claim 25, wherein the transient polar processing aid is selected from the group consisting of water, methanol, ethanol, isopropanol, and combinations thereof.

27. A method of coating an adhesive polymer according to claim 25, wherein the transient polar processing aid comprises from about 0.5 percent to about 10 percent by weight above the weight of residual water present in the hydrophobic adhesive polymer equilibrated at ambient conditions.

28. A method of coating an adhesive polymer according to claim 25, wherein the transient polar processing aid comprises from about 1 percent to about 5 percent by weight above the weight of residual water present in the hydrophobic adhesive polymer equilibrated at ambient conditions.

29. A method of coating an adhesive polymer according to claim 25, wherein the hydrophobic adhesive polymer comprises a hydrophobic pressure-sensitive adhesive polymer.

30. A method of coating an adhesive polymer according to claim 29, wherein the hydrophobic pressure-sensitive adhesive polymer exhibits a glass transition temperature of 20° C. or less.

31. A method of coating an adhesive polymer according to claim 30, wherein the hydrophobic pressure-sensitive adhesive polymer exhibits a glass transition temperature of 0° C. or less.

32. A method of coating an adhesive polymer according to claim 29, wherein the hydrophobic pressure sensitive adhesive polymer is selected from the group consisting of an acrylate pressure-sensitive polymer, a rubber-based pressure-sensitive adhesive polymer, an olefin pressure-sensitive adhesive polymer, a polysiloxane pressure-sensitive adhesive polymer, and combinations thereof.

33. A method of coating an adhesive polymer according to claim 32, wherein the acrylate pressure-sensitive adhesive polymer is formed by suspension polymerization, emulsion polymerization, or solvent polymerization.

34. A method of coating an adhesive polymer according to claim 33, wherein the suspension polymerized acrylate pressure-sensitive adhesive polymer comprises an acrylate pressure-sensitive adhesive copolymer of an acrylic acid ester monomer selected from the group consisting of isooctyl acrylate, isononyl acrylate, 2-ethylhexyl acrylate, butyl acrylate, and combinations thereof, and at least one other monomer selected from the group consisting of acrylic acid, methacrylic acid, N-vinyl pyrrolidone, vinyl acetate, acrylamides, substituted acrylamides, and combinations thereof.

35. A method of coating an adhesive polymer according to claim 25, wherein the coating die comprises a wipe-film coating die, a draw die, a drop-film die, a slot-orifice die, or a roll coater die.

36. A method of coating an adhesive polymer comprising:
(a) providing a hydrophobic adhesive polymer suitable for hot-melt coating;
(b) adding a transient polar processing aid along with the hydrophobic adhesive polymer, wherein the transient polar processing aid comprises at least 0.5 percent by weight above the weight of residual water present in the hydrophobic adhesive polymer equilibrated at ambient conditions; and
(c) hot-melt coating the hydrophobic adhesive polymer onto a substrate utilizing control means for elimination of foaming of the hydrophobic adhesive extrudate.

37. A method of coating an adhesive polymer according to claim 36, wherein the transient polar processing aid is selected from the group consisting of water, methanol, ethanol, isopropanol, and combinations thereof.

38. A method of coating an adhesive polymer according to claim 36, wherein the adding step comprises retaining a residual component of a reaction medium in which the hydrophobic adhesive polymer was polymerized to serve as the transient polar processing aid.

39. A method of coating an adhesive polymer according to claim 36, further comprising, prior to step (b), substantially removing residual volatile components from the hydrophobic adhesive polymer.

40. A method of coating an adhesive polymer according to claim 39, wherein the residual volatile components include unreacted monomers remaining from the polymerization of the hydrophobic adhesive polymer.

41. A method of coating an adhesive polymer according to claim 39, wherein the residual volatile components are removed by melt devolatilization of the hydrophobic adhesive polymer prior to hot-melt coating.

42. A method of coating an adhesive polymer according to claim 36, further comprising, prior to step (c), adding selected additives to the adhesive composition.

43. A method of coating an adhesive polymer according to claim 42, wherein the selected additives comprise thermally-labile additives.

44. A method of coating an adhesive polymer according to claim 43, wherein the thermally-labile additives are selected from the group consisting of medicaments, antimicrobials, pharmaceuticals, perfumes, cross-linking agents, and combinations thereof.

45. A method of coating an adhesive polymer according to claim 36, wherein control means includes means for regulating the temperature of the hydrophobic adhesive polymer prior to hot-melt coating.

46. A method of coating an adhesive polymer according to claim 45, wherein the transient polar processing aid and hydrophobic adhesive polymer comprise an adhesive composition that is hot-melt coated at a temperature below the boiling point of the transient polar processing aid at atmospheric pressure.

47. A method of coating an adhesive polymer according to claim 45, wherein the transient polar processing aid and hydrophobic adhesive polymer comprise an adhesive composition that is hot-melt coated using a contact coating die at a temperature above the boiling point of the transient polar processing aid at atmospheric pressure.

48. A method of coating an adhesive polymer according to claim 36, wherein control means include means for limiting the mixing of the transient polar processing aid with the hydrophobic adhesive polymer prior to hot-melt coating of the hydrophobic adhesive polymer.

* * * * *